UNITED STATES PATENT OFFICE.

ALPHONSO MONROE, OF POYNTELL, PENNSYLVANIA.

ROOFING COMPOUND.

SPECIFICATION forming part of Letters Patent No. 500,024, dated June 20, 1893.

Application filed March 10, 1893. Serial No. 465,383. (No specimens.)

*To all whom it may concern:*

Be it known that I, ALPHONSO MONROE, a citizen of the United States, residing at Poyntell, in the county of Wayne and State of Pennsylvania, have invented new and useful Improvements in Roofing Compounds, of which the following is a specification.

My composition consists of the following ingredients, combined in the proportion stated, viz: Portland cement, two hundred and fifty pounds; sand, four hundred pounds; plaster of paris, one hundred pounds; crude petroleum, one gallon; turpentine, one-half gallon; fine salt, one-half peck; water in sufficient quantity to reduce the whole to a thin plaster.

To prepare the compound the cement, sand and plaster of paris, are first mixed together, while in a dry state. The crude oil, turpentine, and salt are next added to about a half-barrel of water, and thoroughly mixed therewith, and the liquid produced is then poured over the dry compound, and mixed therewith by means of a hoe, or with any suitable apparatus, so as to produce a plaster which can be applied to the roof by means of an ordinary trowel. Additional water can be added, if required, at the time of making the compound, or at any time thereafter.

I find by experiment that the turpentine causes the compound to dry much sooner than it otherwise would; and that by the use of salt, as stated, all danger of freezing is averted, especially when the compound is first applied.

What I claim, and desire to secure by Letters Patent, is—

The herein described roofing composition, consisting of Portland cement, sand, plaster of paris, crude petroleum, turpentine, salt, and water, in the proportions specified.

In testimony whereof I affix my signature in presence of two witnesses.

ALPHONSO MONROE.

Witnesses:
   E. B. UNDERWOOD,
   JAMES MCGRATH.